United States Patent [19]

Hergenrother

[11] 4,064,424
[45] Dec. 20, 1977

[54] VISUAL GLIDE PATH BEACON SYSTEM

[76] Inventor: Rudolf C. Hergenrother, 45 Hidden River Lane, Rte. 2, Sarasota, Fla. 33577

[21] Appl. No.: 762,579

[22] Filed: Jan. 26, 1977

[51] Int. Cl.² .......................... B64F 1/20; G08G 5/00
[52] U.S. Cl. ....................................... 362/231; 340/25
[58] Field of Search ........................... 240/1.2; 340/25

[56] References Cited
U.S. PATENT DOCUMENTS

| 1,961,116 | 5/1934 | Van Vloten | 240/1.2 |
| 3,377,617 | 4/1968 | Projector | 340/25 X |
| 3,771,120 | 11/1973 | Bonazoli et al. | 240/1.2 X |
| 3,821,697 | 6/1974 | Brown | 340/25 X |

Primary Examiner—Leland A. Sebastian
Attorney, Agent, or Firm—George B. Oujevolk

[57] ABSTRACT

Generally speaking, according to the inventive concept, the lamp enclosure is made of an optically transparent material which allows the beacon to be observed by a pilot throughout the entire traffic pattern. The beacons are placed in pairs at opposite ends of a runway so that it becomes possible to dispense with the conventional runway lights presently used to delineate the runway. In order to fill in the dark zone which surrounds the convergence produced when a lens is used to intensify the brightness of the colored zones, the invention uses an apertured mirror positioned opposite the lens. This permits the pilot to see the beacons through all parts of a traffic pattern as well as in the intensified colored zone guidance region. Instead of using a single light source projecting through a color filter to form the color zones as is done in the present art, this invention uses two light sources such as incandescent lamps which project the color zones in slightly different directions which differ, by say, an angle of one degree. The two lamps are flashed on and off alternately producing a "scanning" action of the colored zone pattern.

3 Claims, 8 Drawing Figures

VISUAL GLIDE PATH BEACON SYSTEM

BACKGROUND OF THE INVENTION

The present invention relates to a visual approach slope indicator (VASI) and more particularly is a modification of a VASI type system which allows a relatively wide green zone, while at the same time, indicating to the pilot his position in the green zone, that is, if he is drifting toward the red zone or drifting towards the amber zone.

BRIEF DESCRIPTION OF THE PRIOR ART

Optical beacons have been used for assisting a pilot by visually guiding his aircraft along a desired glide slope during aircraft landing. One such system is known as VASI which is an acronym for Visual Approach Slope Indicator.

In the VASI system, color filters are placed in the path of the light from an incandescent lamp such that a narrow zone, defining the desired glide path is green in color. The zone below is colored red to warn the pilot that he has drifted below the desired glide path. The zone above is colored yellow or amber to indicate to the pilot that he is above the desired glide path.

In the VASI system, the green zone may have a width of several degrees, say between 4° and 6°. The pilot, flying in the green zone, has no indication of his position in this zone. When he drifts below 4° the beacon will suddenly change to red and when he drifts above 6° the beacon will suddenly turn to amber. Narrowing the angular width of the green zone does not help the pilot since this will require him to be continually maneuvering to stay in a narrow green zone.

The optical beacons of the VASI system use an opaque enclosure for the lamp, allowing the pilot to see the beacon only during the final approach path of the aircraft. Furthermore, such beacons using colored light zones to define the correct glide path and the regions above and below the glide path, show an abrupt transition between these regions which is undesirable.

SUMMARY OF THE INVENTION

This invention overcomes the limitations of the prior art systems and in addition provides a fail-safe system with increased lamp operation life time plus means for visual beacon identification.

Generally speaking, according to the inventive concept, the lamp enclosure is made of an optically transparent material which allows the beacon to be observed by a pilot throughout the entire traffic pattern. The beacons are placed in pairs at opposite ends of a runway so that it becomes possible to dispense with the conventional runway lights presently used to delineate the runway. In order to fill in the dark zone which surrounds the convergence produced when a lens is used to intensify the brightness of the colored zones, the invention uses an apertured mirror positioned opposite the lens. This permits the pilot to see the beacons through all parts of a traffic pattern as well as in the intensified colored zone guidance region. Instead of using a single light source projecting through a color filter to form the color zones as is done in the present art, this invention uses two light sources such as incandescent lamps which project the color zones in slightly different directions which differ, by say, an angle of 1°. The two lamps are flashed on and off alternately producing a "scanning" action of the colored zone pattern.

The invention as well as other objects and advantages thereof will become more apparent from the following detailed decription when taken together with the accompanying drawings, in which:

DETAILED DESCRIPTION

Figure 1A:
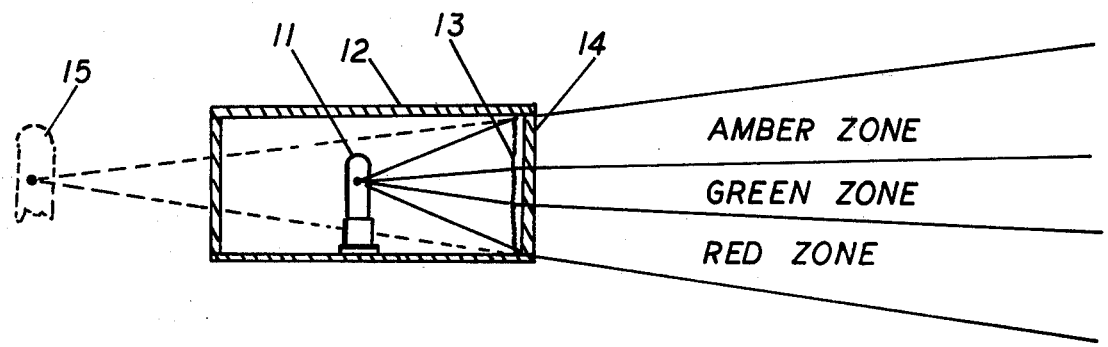
FIG. 1A is a side view of a prior art VASI beacon arrangement.
Figure 1B:
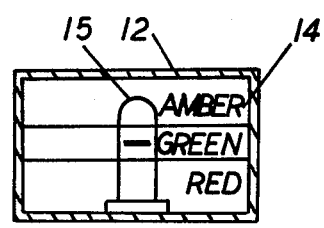
FIG. 1B shows a front view of the prior art beacon arrangement of FIG. 1A.

Shown in FIG. 1A and FIG. 1B is a prior art lamp 11 in an opaque box housing 12 having a front panel lens 13 and a front color filter 14. The lens 13 forms a virtual lamp image 15 behind the box housing 12. This prior art lamp projects a beacon having an upper amber zone, a central green zone and a lower red zone. When viewed from the front it is the virtual lamp image 15 which is seen and the filter 14 with amber, green and red portions.

Figure 2A:
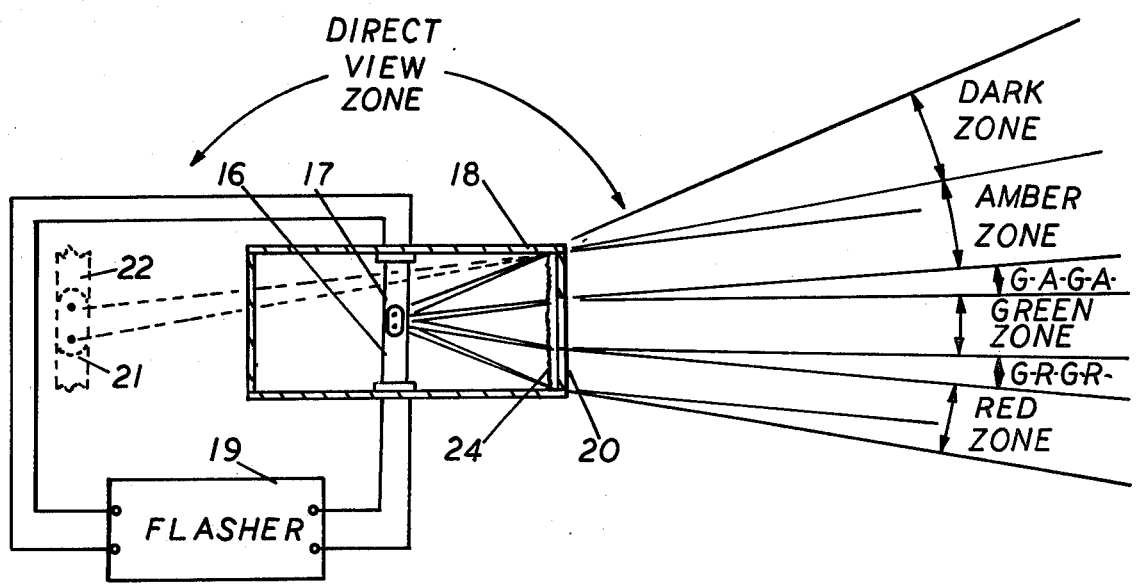
FIG. 2A represents a side view of an improved beacon contemplated herein.

According to the inventive concept, instead of the foregoing one-lamp concept of the prior art, the present invention makes use of two lamps, 16 and 17, in a transparent box enclosure 18 as shown in FIG. 2A. Lamps 16 and 17 are positioned such that their filaments are displaced laterally relative to the color filters. The two lamps are alternately flashed on and off by a flasher 19. The filter 20 is similar to the prior art filter, however, because of the double lamp arrangement the colored zones are scanned through a small angle as the lamps are alternately flashed. Different positions in color pattern when the two lamps are alternately turned on and off are illustrated in FIG. 2A. Since the box is transparent, the lamps can be seen directly from locations outside the color zone pattern.

The colors seen from the two lamp combination in passing from a high to a low position in the color zone field are:

| First Lamp | Second Lamp |
|---|---|
| Amber | Amber |
| Amber | Green |
| Green | Green |
| Green | Red |
| Red | Red |

Figure 2B:
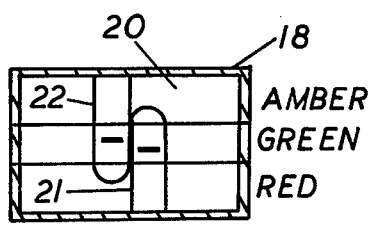
FIG. 2B represents a front view of the improved beacon shown in FIG. 2A.

The lens provides virtual images 21, 22 of lamps 16 and 17 at the rear of the box enclosure. The convergence of the light rays by the lens 24 produce a dark zone surrounding the colored zones as shown in FIG. 2A. A means for "filling in" this dark zone with a mirror of particular shape and position will now be described. FIG. 2B shows a front view of the improved beacon shown in FIG. 2A.

DESIGN OF THE "FILL-IN" MIRROR

Figure 3:
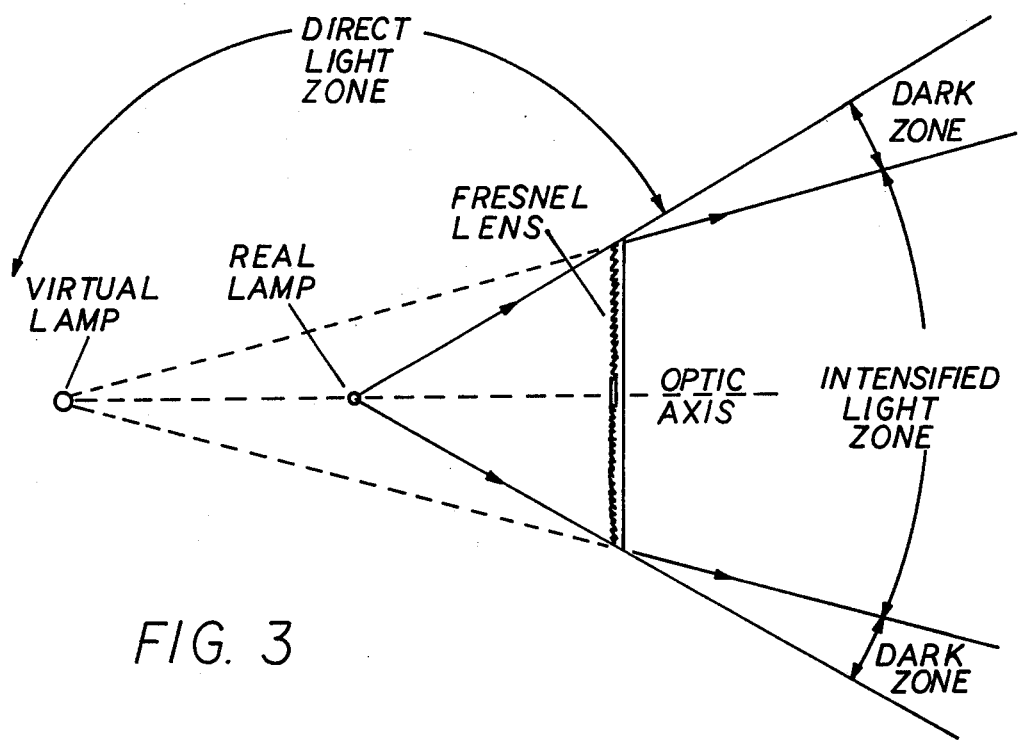
FIG. 3 graphically depicts the prior art beacon.
Figure 4:
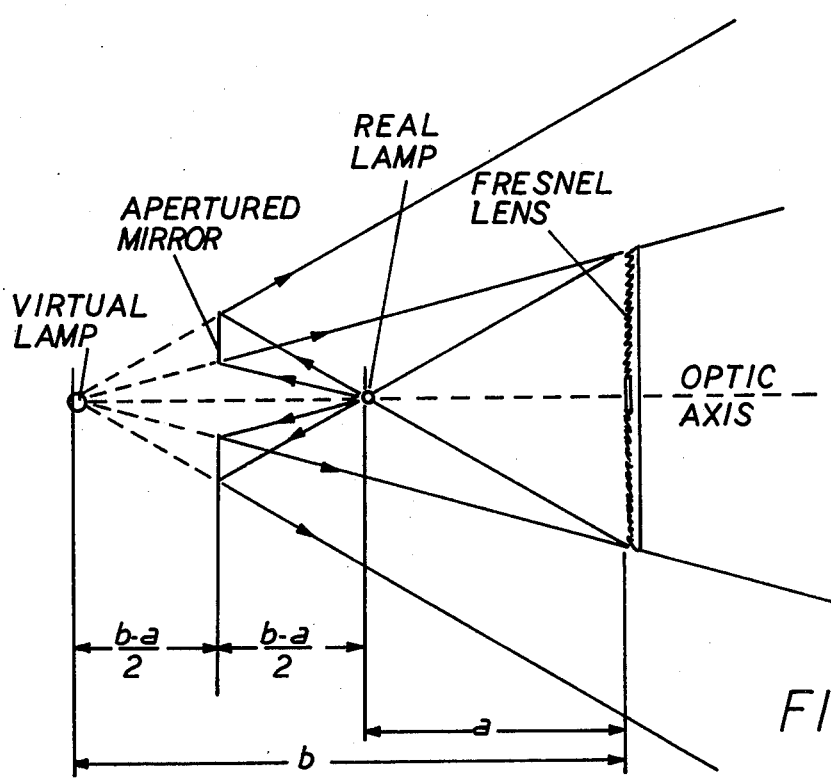
FIG. 4 likewise is a graph but of the inventive concept.

When, as done in prior art devices, a lens is used to intensify the light in the color zone pattern, the convergence of light by the lens will prevent a direct view of the lamps from an area surrounding the color zone pattern as illustrated in FIG. 3. This "dark zone" surrounding the color zone can be "filled in" by means of an apertured mirror placed behind the lamps as illustrated in FIG. 4. The relationship between the focal length $f$ of the lens, the spacing $a$ of the real lamp from the lens and the spacing $b$ of the virtual lamp from the lens is given approximately by the thin lens equation $1/f = 1/a - 1/b$.

If a mirror 23, perpendicular to the optic axis, is placed midway between the real lamp and the virtual lamp as shown in FIG. 4, the dark zone can be "filled in" by reflection of light from the real lamp. An aperture in the center of the mirror will prevent reflected light from the lamp reaching the lens and thus entering the colored zone. The size of the mirror should be only sufficient to fill in the dark zone. From FIG. 4 the relation of mirror size, aperture size and lens size are seen to bear the following relations to location of the lens, the real lamp and the virtual lamp;

$$\frac{\text{Mirror Aperture Size}}{\text{Lens Size}} = \frac{\frac{b-a}{2}}{b}$$

$$\frac{\text{Mirror Outer Size}}{\text{Lens Size}} = \frac{\frac{b-a}{2}}{a}$$

Figure 5:
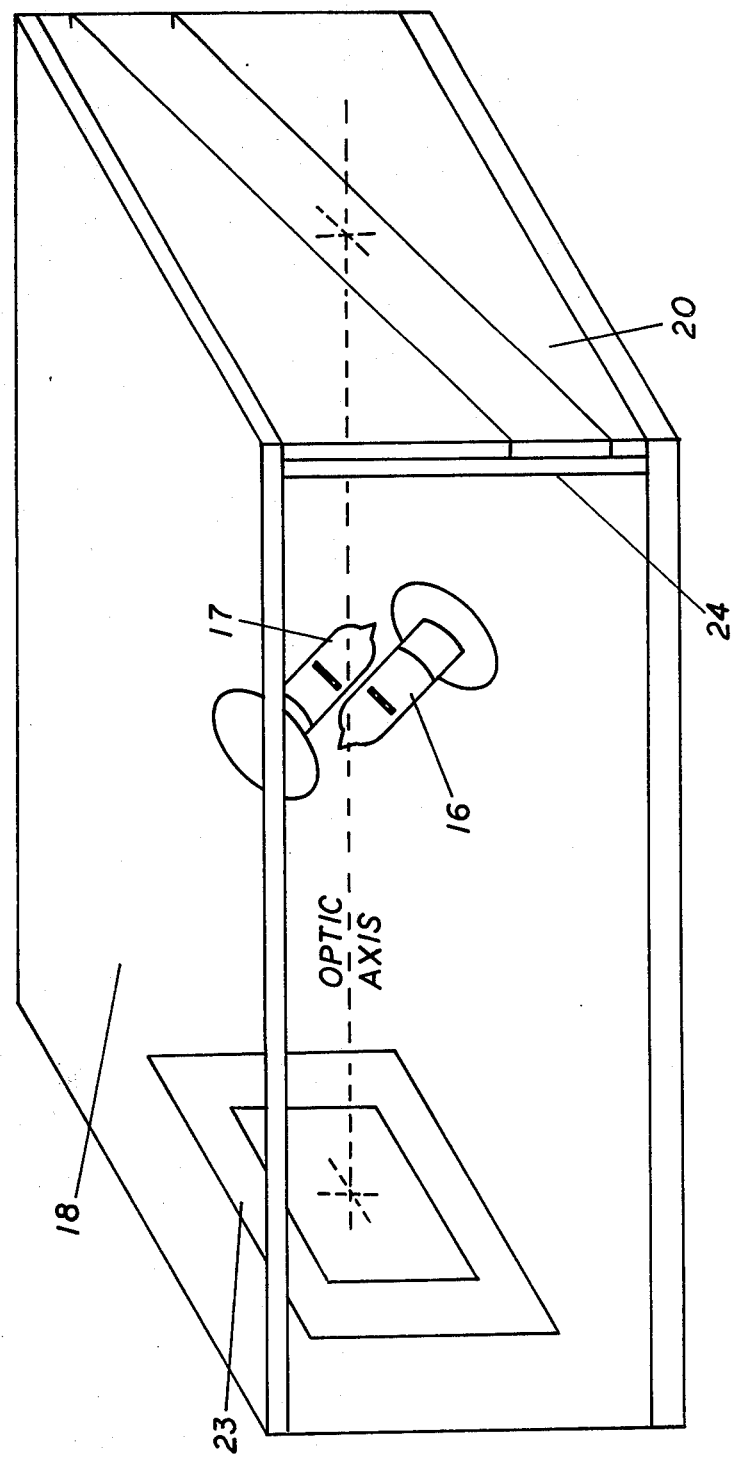
FIG. 5 illustrates in perspective the beacon herein contemplated.

For a rectangular shaped lens as shown in the drawing, these relations apply to each of the two rectangular dimensions of the lens resulting in a rectangular mirror with a rectangular aperture as shown in FIG. 5, designated by 23.

Note that in FIG. 5, the green center part of filter 20 is sloped relative to the box, illustrating one possible beacon design which has been built and tested. Note that the lamps 16 and 17 have their filaments aligned parallel to the slope of the green filter section. The mount (not shown) holding the lamps is attached to the base of the transparent box 18.

The dimensions of the transparent box would preferably be chosen, such that, the apertured mirror will be located on the back surface of the box.

The apertured mirror will itself cast a "shadow" so that the lamp cannot be seen from all positions behind the box. However, since the optic axis of the box is tilted upwards at the glide path angle of about five degrees, a major part of this shadow is projected on the ground and the beacon is visible from all parts of the runway.

An added advantage of the transparent lamp enclosure is that occurence of a lamp burn-out could be observed from all positions of the aircraft flight path as well as from a control tower.

Figure 6:
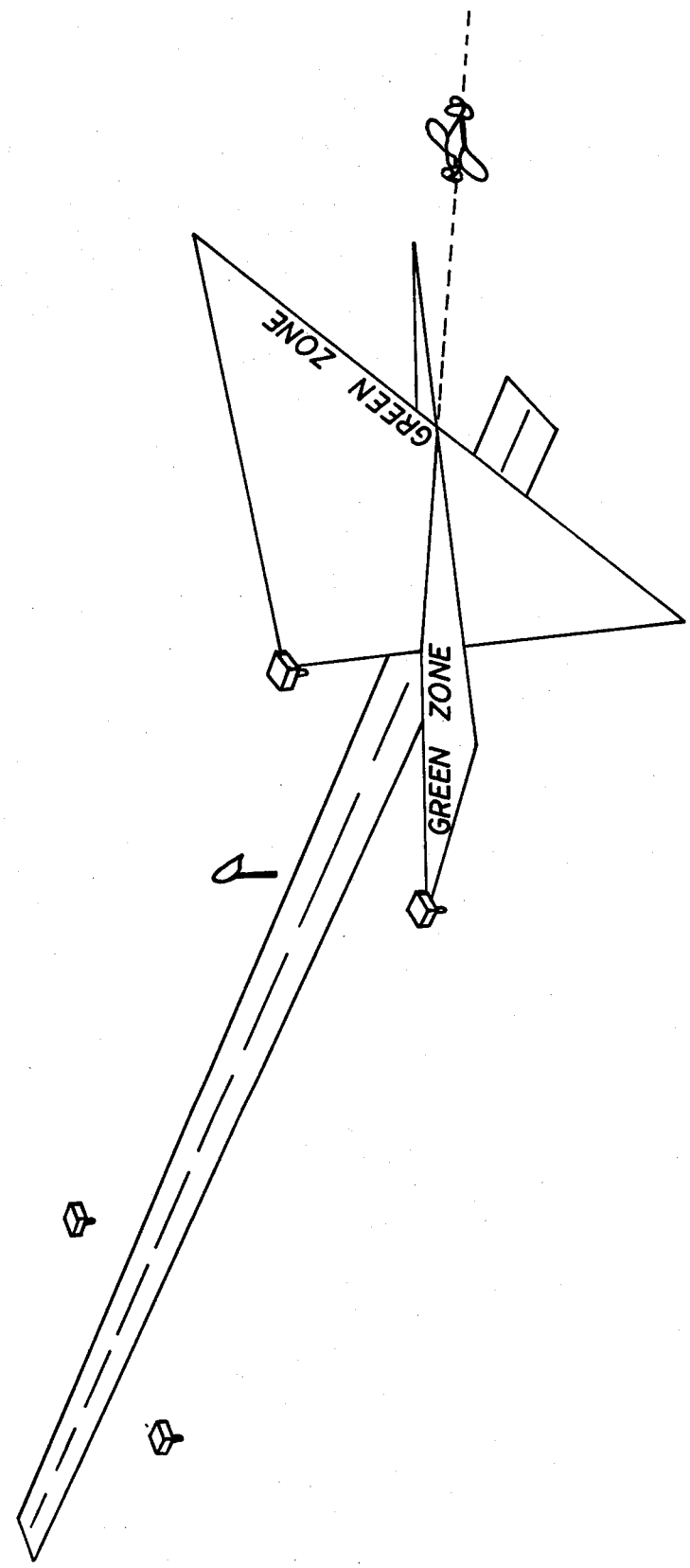
FIG. 6 illustrates a runway with the beacons herein contemplated.

FIG. 6 shows an airport runway having a pair of FIG. 5 beacons positioned at each end. The intersection of the green zones of the pair of beacons at the touchdown end of the runway defines a desired approach path. Within this path, both beacons appear green to the pilot whereas below this desired path, one or both beacons will appear red.

A final advantage of the transparent lamp enclosure is that the beacons are visible to the pilot while he is on the ground during taxiing or take-off or landing run.

Although the plane apertured mirror described is an elegant and structurally simple arrangement, the required "fill in" can be produced approximately by pieces of mirror located in other positions. However, each of these pieces would need to be oriented in a different direction to produce the desired "fill in" reflections.

It is to be observed therefore that the present invention uses two (or more) lamps in the beacon with a single color filter instead of the single lamp of the conventional VASI type system. The two or more lamps are located in slightly different angular directions. The two (or more) lamps are turned on and off successively, thus, producing a scanning action of the colored zone system. The effect of this scanning action is shown in FIG. 2, where a two-lamp system is used as an example. A scanning action could be produced with a single lamp by mechanical displacement of the lamp, but this is not a preferred method.

Instead of separate lamps, a single lamp could be used if this has two (or more) lamp filaments, i.e., light means which are displaced the required amounts from each other and which can be independently turned on and off.

Tests of a two-lamp system have been made using a time cycle of $\frac{1}{2}$ second on and $\frac{1}{2}$ second off for each lamp and switching from one lamp to the other alternately. This gives a nearly continuous light from the beacon with only a small dip in brightness during the switching periods. A green zone of 2° in width with a scan angle of 1° was used. This was set to give Red-Red at 3° and less, Red-Green from 3° to 4°, Green-Green from 4° to 5°, Green-Amber from 5° to 6° and Amber-Amber at 6° and greater. Flight tests on the system were eminently satisfactory.

Using three successively switched lamps with appropriate scan angles for example, permits finer perception of deviations in the flight path. Extension of the principle to more lamps is obvious.

The system described has a fail-safe feature in that if one of the two lamps burns out, the system is still operational while the burn-out will be immediately noticeable because of the short dark periods caused by the burn-out.

An additional advantage of the SCAN VASI system is that each lamp is only on for half the time so the beacon operation life of each lamp is twice as great as in the conventional systems where the lamp burns continuously. The system can be used with any design of directed colored beam visual beacon system.

It is further to be observed that the present invention provides for a (VASI) visual approach slope indicator beacon in a rectangular transparent box-like enclosure 18 with defined bottom front end and back ends. There is a filter 20 and a lens 24 at said front end, the filter 20 providing amber, green and red beacon sections. First and second light means 16, 17, said lamps having their filaments displaced to slightly different lateral positions with flasher means 16a coupled to said light means 16, 17. A mirror 23 with a central rectangular aperture is located at said rear end, the relationship between the focal length $f$ of the lens, the spacing $a$ of the real lamp for the lens and the spacing $b$ of the lamp's virtual lamp image from the lens is represented by the equation:

$$1/f = 1/a - 1/b$$

and the outer size of the mirror is represented by the following equation:

$$m/l = (b-a)/(2/a)$$

and the mirror aperture size is represented by the following equation:

$$m/l = (b-a)/(2/b)$$

where $M$ is the mirror outer size; $m$ is the mirror aperture size and $l$ is the lens size.

I claim:

1. A visual approach slope indicator beacon comprising in combination:
   a. a rectangular transparent box-like enclosure (18) with defined top, bottom, front end and back ends;
   b. a filter (20) an a convex lens (24) at said front end, said filter (20) providing amber, green and red beacon sections;
   c. first and second light means (16, 17) having their filaments positioned at slightly different angles relative to the filter with flasher means coupled to said light means (16, 17); and,
   d. a mirror (23) with a central rectangular aperture positioned midway between the real lamp and its virtual image produced by the lens.

2. A beacon as claimed in claim 1 wherein the relationship between the focal length $f$ of the lens, the spacing $a$ of the real lamp from the lens and the spacing $b$ of the lamp's virtual image from the lens is represented by the equation:

$$1/f = 1/a - 1/b$$

and the outer size of the mirror is represented by the equation:

$$m/l = (b-a)/2a$$

and the mirror aperture size is represented by the equation:

$$m/l = (b-a)/2b$$

where $M$ is the mirror outer size; $m$ is the mirror aperture size and $l$ is the lens size.

3. A beacon as claimed in claim 2 wherein the light means are lamps.

* * * * *